Nov. 30, 1926.

E. R. GURNEY 1,608,853

MOTOR SUPPORT

Filed June 17, 1925    2 Sheets-Sheet 1

Inventor
Erving R Gurney.
By his Attorneys
Redding, Greeley, O'Shea & Campbell

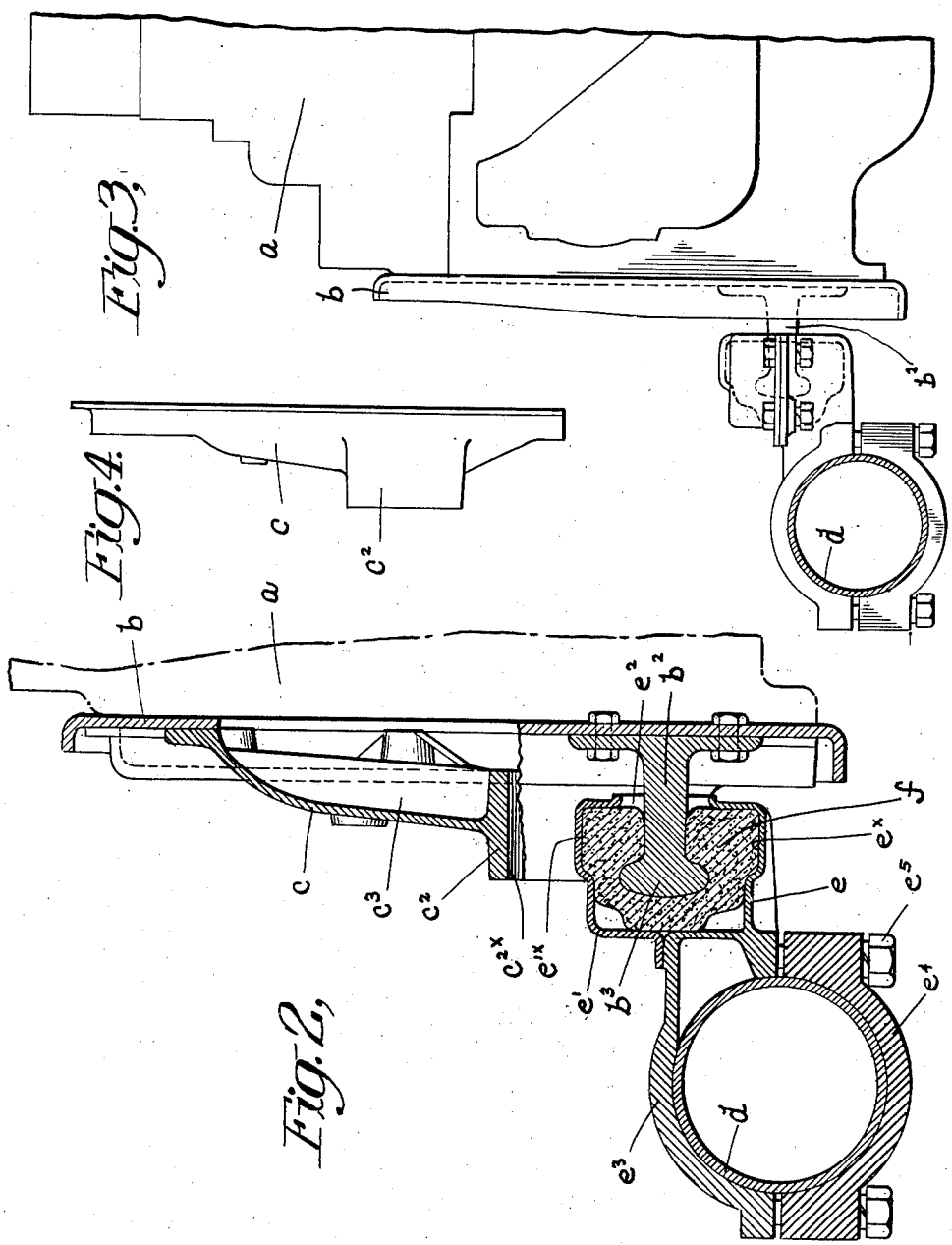

Patented Nov. 30, 1926.

1,608,853

UNITED STATES PATENT OFFICE.

ERVING R. GURNEY, OF NEW YORK, N. Y., ASSIGNOR TO INTERNATIONAL MOTOR COMPANY, OF NEW YORK, N. Y., A CORPORATION OF DELAWARE.

MOTOR SUPPORT.

Application filed June 17, 1925. Serial No. 37,624.

This invention relates to motor supports and more particularly to a support for the front end of the motor in self-propelled vehicles. The invention has for one of its objects to provide a support which shall afford access to and permit ready removal of the various shafts and bearings of the motor and which shall at the same time be practical from considerations of manufacture and use. To this end a metal plate which may be formed of pressed steel, for instance, is adapted to be secured to the front end of the motor and has a portion thereof cut away and adapted to be closed by a cover plate which must be of cast aluminium, for instance, and within which may be formed apertures for the passage of the starting crank, for instance. The closure may also serve as a support for various auxiliary devices necessary to the operation of the vehicle. It is also an object of the invention to provide a motor support which shall involve yielding non-metallic connections and supports of the character broadly disclosed in the patent to Alfred F. Masury and August H. Leipert No. 1,404,876, dated January 31, 1922. Accordingly arms are carried with the pressed metal plate which are adapted to be received by blocks of yielding non-metallic material retained within housings carried with the vehicle frame. These and other objects of the invention and the means for their attainment will be more particularly described with reference to the accompanying drawings illustrating a preferred embodiment thereof, in which:

Figure 2 is a view taken in the planes indicated by the broken line 2—2 in Figure 1 and looking in the direction of the arrows and showing the motor support, the closure and the yielding non-metallic connections with the vehicle frame.

Figure 3 is a view in side elevation somewhat similar to Figure 2 but on a reduced scale and with the closure member removed.

Figure 4 is a view in side elevation showing the closure or cover plate which is preferably of cast aluminium and which is formed with passages for crank shafts and the like.

Figure 1:
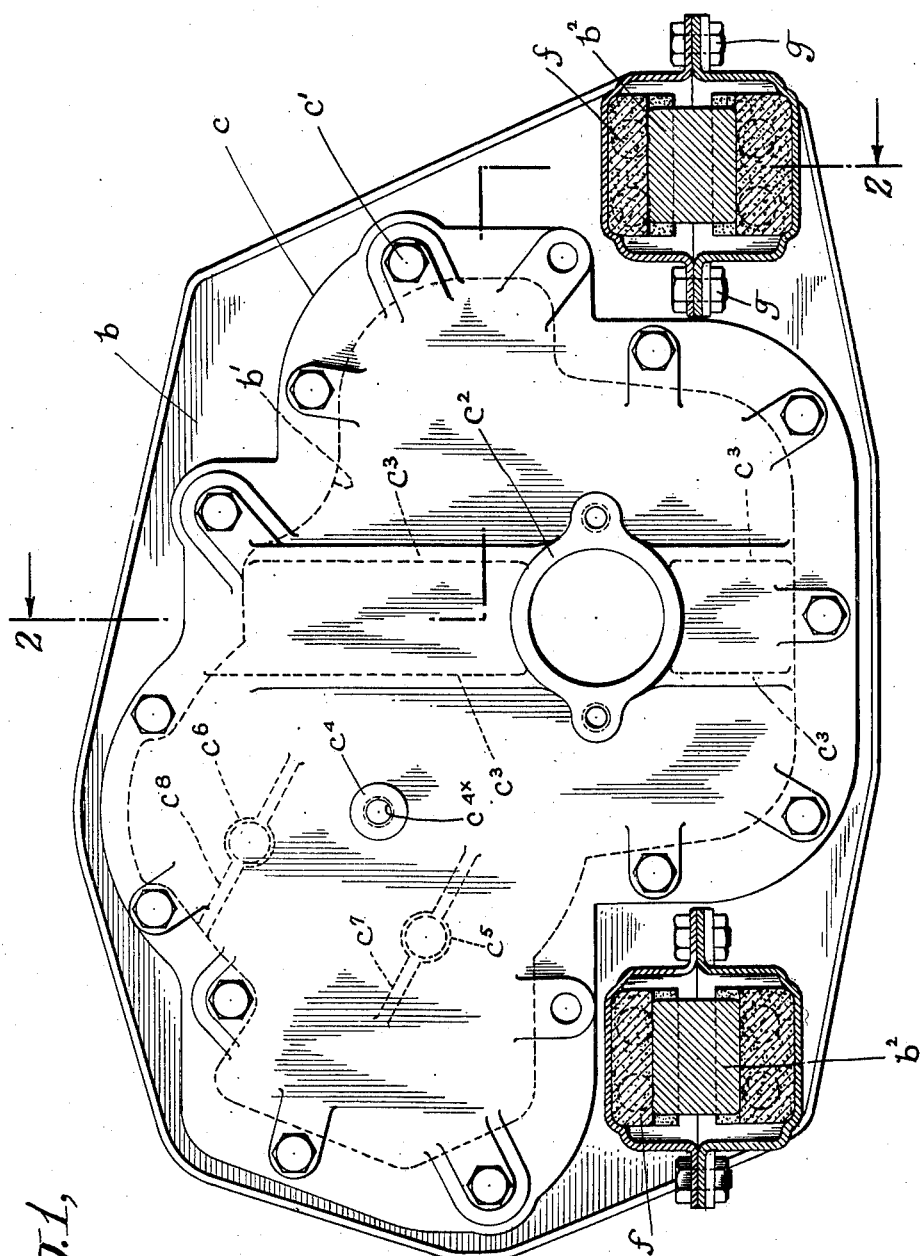
Figure 1 is a view in front elevation and partly in section showing the motor support according to the present invention.

Referring to the drawings a fragmentary portion of the front end of the motor is indicated at $a$ in Figures 2 and 3 and to the front face of the motor is adapted to be secured a member $b$ which is preferably of pressed metal, such as steel, and is formed with an opening or cut away portion $b'$ which exposes that portion of the front end of the motor wherein are disposed the shafts and the like. A closure for the opening $b'$ is indicated at $c$ and is adapted to be secured to the front face of the support member by means of bolts or the like whereby it may be readily removed. The closure is preferably formed of cast metal, such as cast aluminium. Closure $c$ is formed centrally thereof with a boss $c^2$ bored to serve as a passage $c^{2x}$ for a starting crank for the propelled shaft (not shown) and the boss is re-enforced by vertically extending ribs or fins $c^3$ inwardly thereof, both above and below the boss. A boss $c^4$ is also formed on the closure within which is formed a passage $c^{4x}$. Adjacent the boss $c^4$ are shown a pair of bosses $c^5$, $c^6$, re-enforced by parallel ribs $c^7$, $c^8$, respectively. The bosses $c^5$ and $c^6$ may serve as supports for the magneto or the like and the timer shaft may extend through the passage $c^{4x}$.

A transversely extending tubular cross member of the chassis frame is indicated at $d$ and it is proposed to support the front end of the motor from this cross member. A pair of arms $b^2$ are formed or secured to the support $b$ and are formed at their outer ends with enlarged portions $b^3$. These arms are preferably disposed one upon either side and symmetrically placed with respect to the axis of the crank shaft. Each arm $b^2$ is adapted to extend within a housing carried with the vehicle frame. Each housing comprises a main housing portion $e$ and a closure member $e'$ having an opening $e^2$ in one side thereof through which an arm extends. Formed on or secured to housing portion $e$ there is disclosed a cylindrical bearing member $e^3$ adapted to engage the cross member $d$ to form a half bearing, the other half of which is indicated at $e^4$ and the two bearings $e^3$ and $e^4$ may be rigidly secured together in clamping engagement with respect to the member $d$ by means of bolts $e^5$. Within the housing there is disposed a block of yielding non-metallic material $f$ adapted to engage the arm and yieldingly retain the same. Seats $e^x$ and $e'^x$ are formed in the housing proper and cover member, respectively to facilitate the positioning of the block *f*. The sections *e* and *e'* are adapted to be secured together by means of bolts *g* whereby the desired degree of compression may be exerted upon the block *f*. By so retaining the blocks under compression their strength, resiliency and wearing qualities are increased.

It will thus be seen that a practical support for the front end of a motor has been provided which is applicable to the use of yielding non-metallic material as a connection and support between the motor and the chassis frame and which at the same time affords ample and convenient access to the front end of the motor for replacement and repairs.

While the motor support and closure member have been described as formed of pressed metal and a metallic casting, respectively, it will be apparent to those skilled in the art that various substitutions may be made therefore as well as in the configuration and arrangement of the component elements of the motor support and no limitation is intended by the phraseology of the foregoing description or by the illustrations except as indicated in the accompanying claims.

What I claim is:

1. The combination with an internal combustion engine and a transversely extending frame member, of a motor support to which the front end of the engine is secured and which has formed therein an opening, longitudinally extending arms carried with the motor support and symmetrical with respect to the vertical axis of the engine, a closure for the said opening and connections between the arms on the motor support and the transverse frame member.

2. The combination with an internal combustion engine and a transversely extending frame member, of a motor support to which the front end of the engine is secured and which has formed therein an opening, longitudinally extending arms carried with the motor support, and symmetrical with respect to the vertical axis of the engine, a closure for said opening, and yielding non-metallic connections between the arms on the motor support and the transverse frame member.

3. The combination with an internal combustion engine and a transversely extending tubular frame member, of a pressed steel motor support to which the front end of the engine is bolted and which has an opening formed therein and longitudinally extending arms carried therewith symmetrically disposed upon opposite sides of the longitudinal axis of the motor, a cast aluminium closure for said opening formed with passages for shafts of the engine, bolts to secure the closure to the support, housings carried with the transverse frame member and formed with an opening in one side into which the arms extend respectively, and blocks of yielding nonmetallic material retained within the housings and engaging the arms.

This specification signed this 15th day of June A. D. 1925.

ERVING R. GURNEY.